(12) United States Patent
Elkhattib

(10) Patent No.: US 12,479,350 B1
(45) Date of Patent: Nov. 25, 2025

(54) MOBILE COLLECTION AND DISTRIBUTION CART

(71) Applicant: Sahier Elkhattib, Sherman Oaks, CA (US)

(72) Inventor: Sahier Elkhattib, Sherman Oaks, CA (US)

( * ) Notice: Subject to any disclaimer, the term of this patent is extended or adjusted under 35 U.S.C. 154(b) by 748 days.

(21) Appl. No.: 17/890,518

(22) Filed: Aug. 18, 2022

Related U.S. Application Data

(60) Provisional application No. 63/236,795, filed on Aug. 25, 2021.

(51) Int. Cl.
*B60P 3/36* (2006.01)
*B62B 5/00* (2006.01)

(52) U.S. Cl.
CPC .............. *B60P 3/36* (2013.01); *B62B 5/0046* (2013.01); *B62B 5/0053* (2013.01); *B62B 5/0069* (2013.01); *B62B 2202/42* (2013.01); *B62B 2204/04* (2013.01)

(58) Field of Classification Search
CPC . B60P 3/36; B60P 3/32; B62B 5/0046; B62B 5/0053; B62B 5/0069; B62B 2202/42; B62B 2204/04; B62B 5/0056
See application file for complete search history.

(56) References Cited

U.S. PATENT DOCUMENTS

| | | | | |
|---|---|---|---|---|
| 5,878,592 A | * | 3/1999 | Borges | B60H 1/3232 62/298 |
| 7,210,545 B1 | | 5/2007 | Waid | |
| 7,762,363 B1 | | 7/2010 | Hirschfeld | |
| 8,141,666 B2 | * | 3/2012 | Ganiere | B60L 50/51 180/65.31 |
| 8,205,399 B2 | * | 6/2012 | Ralston | B60P 3/32 52/143 |
| 8,776,449 B1 | * | 7/2014 | Rowan | E04H 1/1205 52/79.1 |
| 8,991,529 B2 | * | 3/2015 | Bryant | B62D 51/001 180/19.2 |
| 9,283,974 B2 | | 3/2016 | Cates | |
| 10,328,965 B2 | * | 6/2019 | Britton | B62K 27/003 |
| 10,377,403 B2 | * | 8/2019 | Lee | B60K 17/043 |

(Continued)

FOREIGN PATENT DOCUMENTS

| | | | | |
|---|---|---|---|---|
| CN | 106904115 A | * | 6/2017 | ........... B62D 27/065 |
| CN | 107046394 A | * | 8/2017 | ................ B60P 3/32 |

(Continued)

OTHER PUBLICATIONS

Translated CN-107046394-A (Year: 2025).*

*Primary Examiner* — James A Shriver, II
*Assistant Examiner* — Ian Bryce Shelton

(57) ABSTRACT

A mobile collection and distribution cart allows a place for users to sleep, lounge, or stand up, as well as a storage place for belongings or recyclables collected from streets or roads. The cart is solar powered by cells on the roof and awning, with storage in a battery. The battery powers a motor attached to the cart wheels. This motor can become a generator when the cart is pushed or pulled with handles or a tow bar. The cart collects rainwater on a slanted roof and stores the rainwater for later use. The cart has a ventilation system which in some embodiments includes an air conditioner system. The cart has a global positioning tracker and a camera for security.

10 Claims, 8 Drawing Sheets

(56) References Cited

U.S. PATENT DOCUMENTS

| | | | |
|---|---|---|---|
| 10,703,401 B2* | 7/2020 | Lee | B62B 5/0043 |
| 11,951,798 B2* | 4/2024 | Jurek | B60H 1/00207 |
| 11,987,093 B2* | 5/2024 | Jurek | B60H 1/00364 |
| 2007/0090702 A1* | 4/2007 | Schiller | A45C 15/00 |
| | | | 280/655 |
| 2008/0122227 A1* | 5/2008 | Hammerle | B60R 25/00 |
| | | | 290/1 R |
| 2009/0209193 A1* | 8/2009 | Kloster | B60H 1/3204 |
| | | | 454/241 |
| 2010/0133873 A1* | 6/2010 | Carlton | B60P 3/32 |
| | | | 52/794.1 |
| 2011/0107690 A1* | 5/2011 | Ralston | B60P 3/32 |
| | | | 52/173.1 |
| 2015/0075880 A1 | 3/2015 | Grossen | |
| 2016/0207372 A1* | 7/2016 | Parry | B60H 1/00364 |
| 2017/0129522 A1* | 5/2017 | Lee | B60K 1/04 |
| 2017/0341562 A1* | 11/2017 | Knight | B60P 3/34 |
| 2017/0361861 A1* | 12/2017 | Britton | B62B 7/008 |
| 2018/0056843 A1* | 3/2018 | Michalski | B62B 5/0053 |
| 2018/0162433 A1* | 6/2018 | Jones | B62B 5/0036 |
| 2019/0092365 A1* | 3/2019 | Lee | B62B 5/06 |
| 2020/0391650 A1* | 12/2020 | Leishman | B60R 5/02 |
| 2022/0001718 A1* | 1/2022 | Jurek | B60H 1/00528 |
| 2022/0145613 A1* | 5/2022 | Haynes | B62D 27/02 |
| 2022/0176775 A1* | 6/2022 | Jurek | B60H 1/00364 |
| 2022/0185356 A1* | 6/2022 | Saavedra | B62B 7/00 |
| 2022/0355720 A1* | 11/2022 | Kane | B60P 3/34 |

FOREIGN PATENT DOCUMENTS

| | | | | |
|---|---|---|---|---|
| CN | 113212287 A | * | 8/2021 | H02J 7/35 |
| CN | 113212288 A | * | 8/2021 | H02S 20/00 |
| DE | 202005017433 U1 | * | 2/2006 | B60P 3/32 |
| DE | 102013102649 A1 | * | 7/2014 | A47J 39/006 |
| EP | 1782999 A2 | * | 5/2007 | B60P 3/32 |
| KR | 20090012164 U | * | 12/2009 | B62B 9/14 |
| KR | 101946171 B1 | * | 2/2019 | B62B 9/00 |
| KR | 20190036250 A | * | 4/2019 | B60D 1/00 |
| WO | WO-2006016794 A1 | * | 2/2006 | B60P 3/32 |
| WO | WO-2008010209 A2 | * | 1/2008 | B62B 9/14 |
| WO | WO-2009061700 A1 | * | 5/2009 | E04H 1/1205 |
| WO | WO-2014189956 A1 | * | 11/2014 | B62B 3/02 |

* cited by examiner

MOBILE COLLECTION AND DISTRIBUTION CART

FIELD OF THE INVENTION

The present invention relates to carts or wagons. More specifically, the present invention relates to mobile collection and distribution carts.

BACKGROUND OF THE INVENTION

In the modern world, many unused and unneeded materials are thrown along city and rural streets, creating a messy and trash filled environment. Properly getting rid of unwanted materials takes both time and money to either schedule a pickup to have someone remove the materials or having bulky trucks haul the materials away. This is limiting in certain communities that cannot afford this extra cost resulting in neighborhoods that are not clean and are less environmentally friendly. Additionally, modern city cleaning only has trash trucks come at specified scheduled times and not based on demand, resulting in periods of time where the sidewalks and streets are cluttered and crowded with trash that could otherwise be easily dealt with. What is needed is a device that allows the homeless to clean streets and recycle materials in an ecologically friendly way.

SUMMARY OF THE INVENTION

A mobile collection and distribution cart allows the user to collect recyclables and other trash from city streets or rural roads. The cart also allows a place for users to sleep, lounge, or stand up. The cart can be used to transport people or objects. Users without other shelter can sleep in the cart. Disabled users can hook wheelchairs to the cart when needed, providing an easier way to be mobile and a comfortable place to rest. The cart collects rainwater on a slanted roof and stores the rainwater until needed. The cart is solar powered by cells on the roof and an awning, with storage in a battery. The battery powers a motor attached to the wheels of the cart to propel the cart. In the event that the cart is being towed or pushed, the motor operates to generate power which is stored in the battery. The cart has a ventilation system which in some embodiments has a fan connected to a fan motor for air circulation. In other embodiments, the cart has an air conditioner to cool the air. The cart has a global positioning tracker for security. The cart also has a camera which can be used for security, or the camera may be part of a mobile device which is used for communication with other carts or other mobile devices. The cart has an awning which can shield the sun off the user and has solar panels for generating more electricity to be stored in the battery.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

DETAIL DESCRIPTIONS OF THE INVENTION

Figure 1:
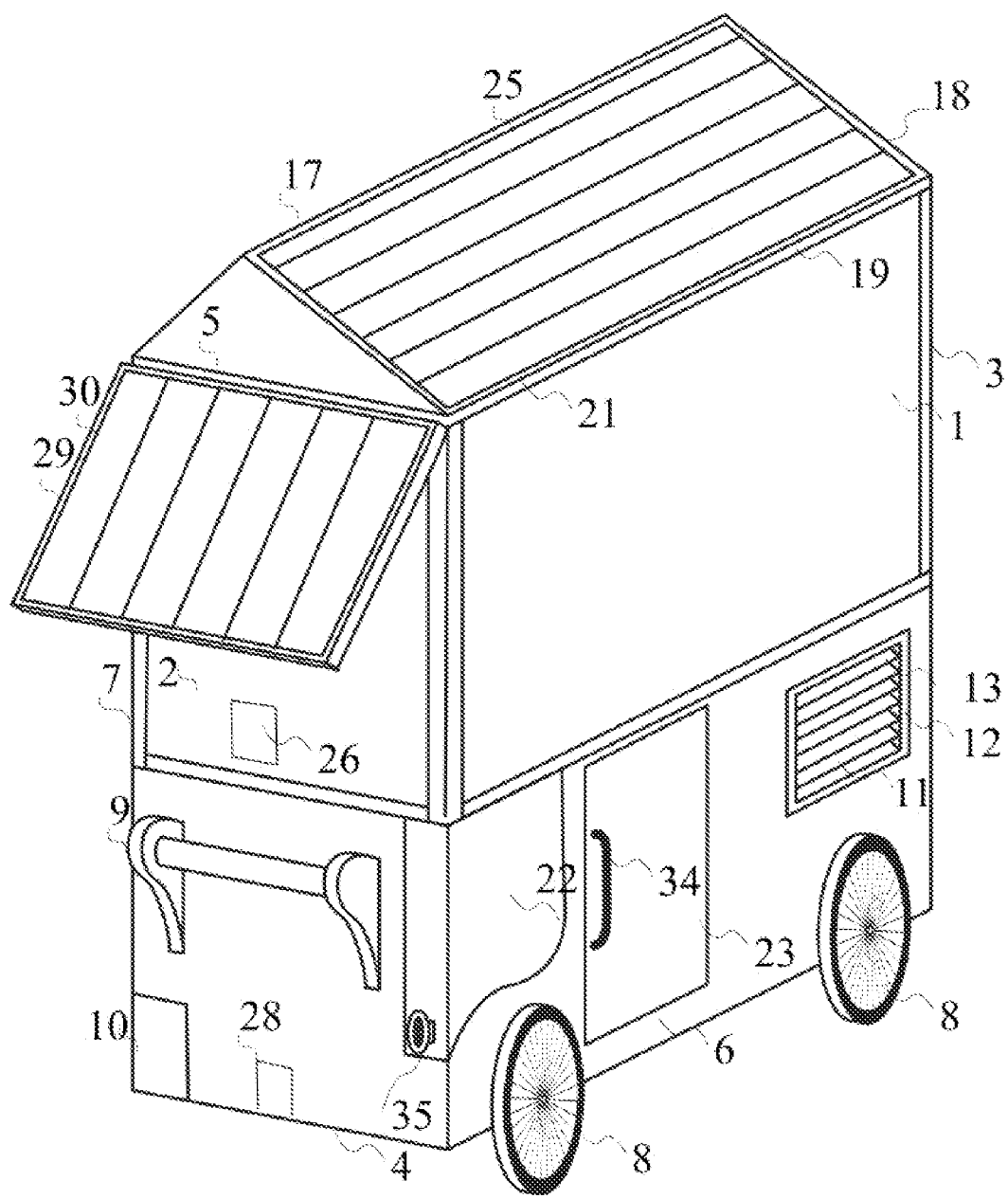
FIG. 1 is a front right perspective view of one embodiment of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or"

denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Figure 3:
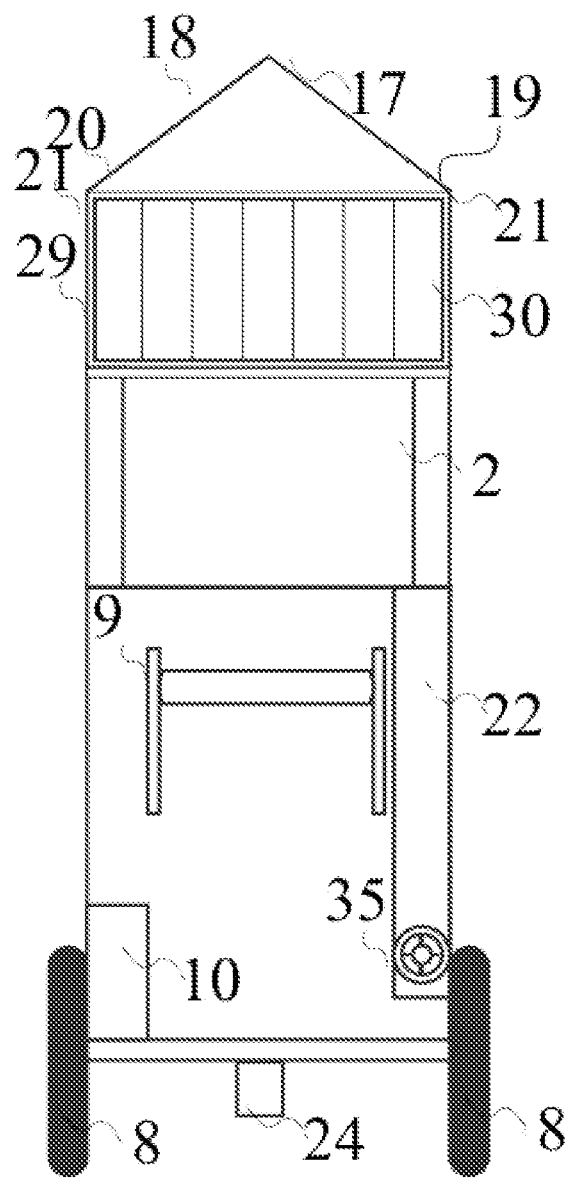
FIG. 3 is a front view of one embodiment of the present invention.

Overview:

As shown in FIG. 1, a mobile collection and distribution cart (hereinafter "the cart") has a lounging and storage compartment 1. This lounging and storage compartment 1 has a front side 2 a back side 3, a bottom side 4, a top side 5, a first side 6, and a second side 7. The lounging and storage compartment 1 in some embodiments is large enough for a person to stand up inside and in other embodiments the lounging and storage compartment 1 is large enough to accommodate a person who is seated or lying down. The cart has a plurality of wheels 8 rotatably attached to the cart. In preferred embodiments, the cart has four wheels 8. Two wheels 8 are on the first side 6 of the lounging and storage compartment, and two wheels 8 are on the second side 7 of the lounging and storage compartment 1. Said wheels 8 are arranged so that the cart is moveably supported by the wheels 8. A motor 24 is connected to at least one wheel in order to propel the cart, as shown in FIG. 3. In preferred embodiments, the motor 24 is connected to at least two wheels 8. The motor 24 may be a multi-phase electric motor of the type used in electric cars. The motor 24 is electrically connected to a battery 10. The motor 24 can be a generator when the cart is pushed. In the event that the cart is pushed or propelled in any other manner, the motor 24 sends current back to the battery 10 for storage.

The front side 2 of the lounging and storage compartment 1 has a handle 9 fixedly attached to the front side 2. The back side 3 of the lounging and storage compartment 1 has a handle 9 fixedly attached to the back side 3. The handle 9 is of a sufficient size that a person can use the handle 9 to push or pull the cart. The handle 9 may be made up of metal, leather, or any other appropriate material.

A battery 10 is stored within the lounging and storage compartment 1. The battery receives power from a plurality of solar panels 25, a plurality of awning solar panels 30, and the motor 24. The battery 10 may also be powered by connecting to a standard wall outlet or an electrical vehicle charging station. The battery 10 may be a lithium-ion battery such as used in an electric vehicle or any other battery of sufficient storage capacity.

Figure 6:
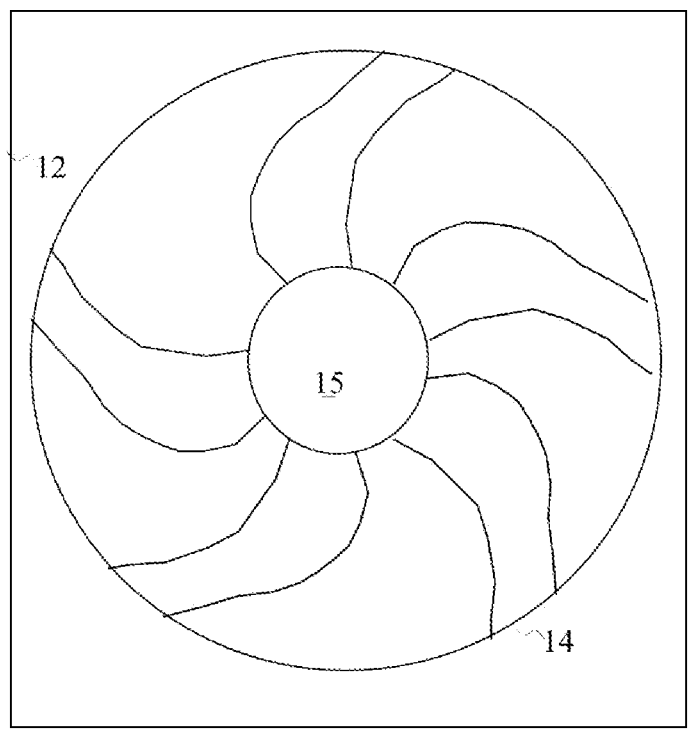
FIG. 6 is a view of the ventilation fan of one embodiment of the present invention.
Figure 7:
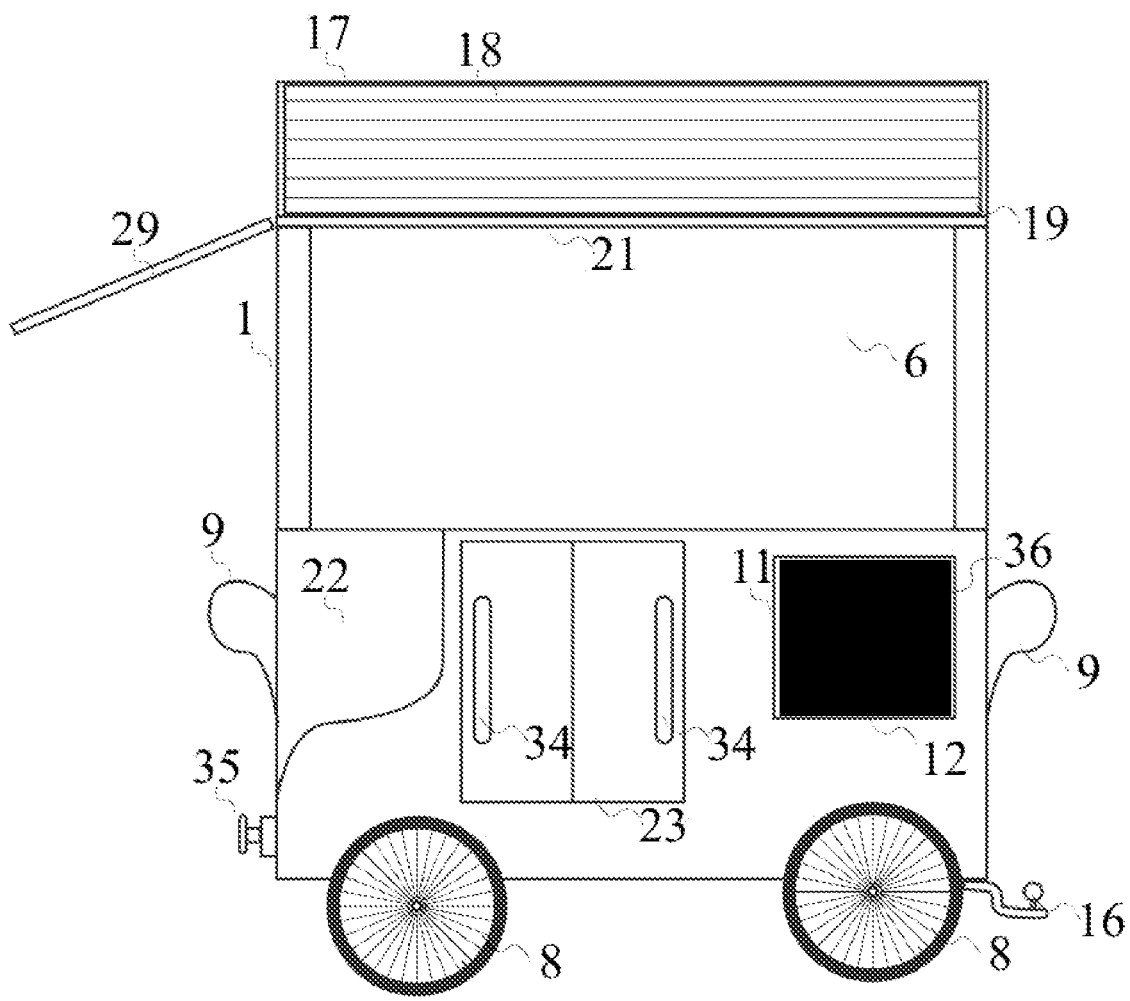
FIG. 7 is a right-side view of one embodiment of the present invention showing an air conditioner.

The cart also includes a ventilation system 11 for aerating the lounging and storage compartment 1 and making the lounging and storage compartment 1 more comfortable. This ventilation system consists of at least one opening 12 through a first side 6, a second side 7, a front side 2, or a back side 3 of the lounging and storage compartment 1. This at least one opening 12 may have a plurality of shutters 13 to close the opening 12 in the event of rain, cold weather, or other weather events. As shown in FIG. 6, A rotatable fan such as fan 14 may be operably attached to the opening 12. The rotatable fan 14 is connected to a fan motor 15. The fan motor 15 is electrically connected to the battery 10, shown in FIG. 1. Alternatively, or additionally, as shown in FIG. 7, an air conditioning system 36 may be used to keep the temperature inside the cart cool. An air conditioning system 36 may be electrically connected to the battery 10.

FIG. 1 also shows a camera 26 fixedly attached to a front side 2 of the cart. This camera 26 could be a mobile device such as a cell phone. The camera 26 is used for security and for communication between carts and between carts and other mobile devices. The camera 26 may be powered by the battery 10, or the camera 26 may have any other battery. A global positioning tracker 28 is fixedly attached to the cart for monitoring of the cart's position. The global positioning tracker 28 may be powered by the battery 10, or the global positioning tracker 28 may have any other battery.

Figure 2:
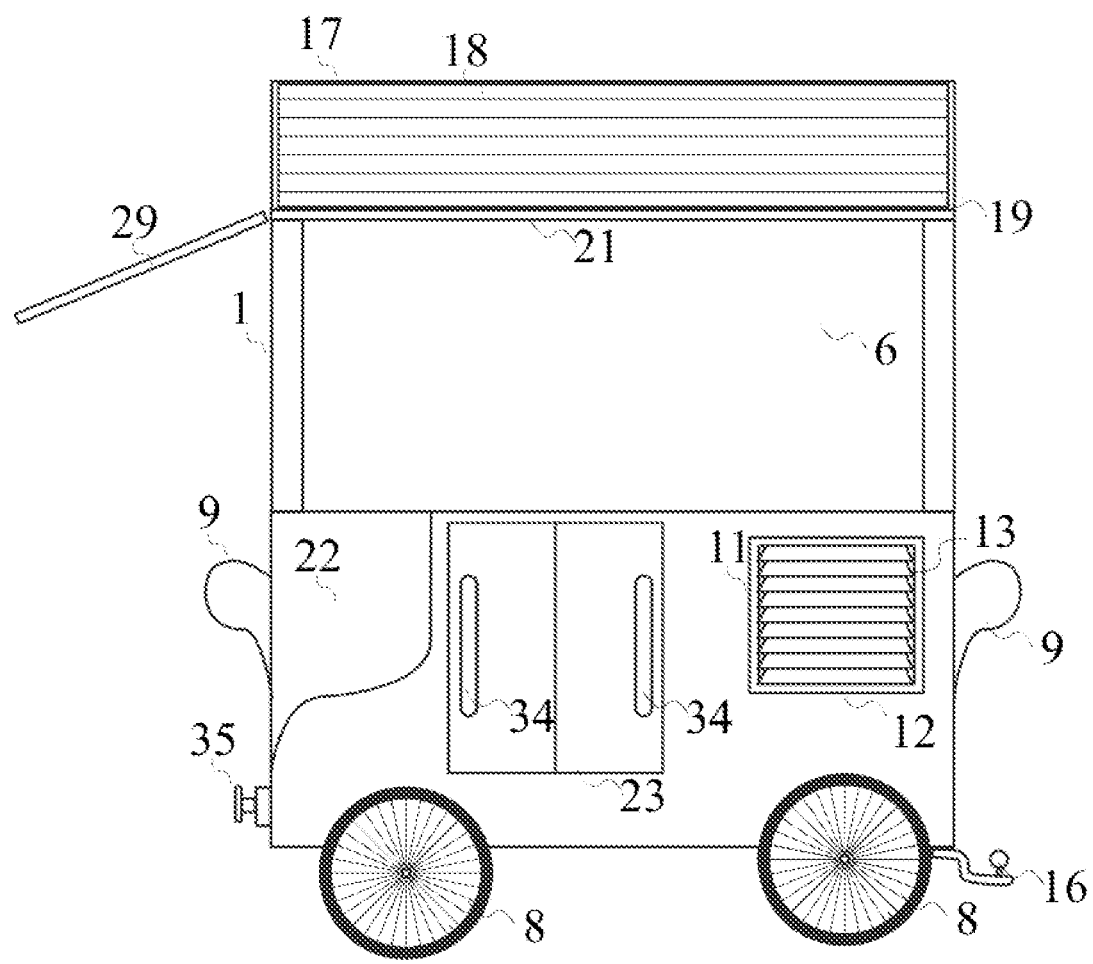
FIG. 2 is a right-side view of one embodiment of the present invention.

FIG. 2 shows a right-side view of one embodiment of the cart with a tow bar 16 attached to the cart. The cart may be towed by the tow bar 16 by any other vehicle. The wheels 8 generate power through the motor 31 which flows to the battery 10 for storage as the cart is towed, as shown in FIG. 1. The tow bar can be used to connect a wheelchair to the cart for easier mobility of disabled users. Handles 9 allow a user to push or pull the cart. A door 23 may have a plurality of handles 34 situated on it in a manner so that the door 23 may be opened and a user may enter the lounging and storage compartment 1. The roof 17 is slanted 18 and a roof first edge 19 has a gutter 21 attached so that rainwater can be collected in a water storage unit 22. A faucet 35 is operatively attached to the water storage unit 22 so that water can be used for the user's daily activities. This first side 6 is shown with a ventilation system 11 which comprises an opening 12 in the first side 6. A plurality of shutters 13 is installed in the opening 12 in order to close in the event of rain, cold weather, or other weather events.

FIG. 3 shows a front view of the cart. In preferred embodiments, a motor 24 is connected to at least two wheels 8. The motor 24 may be a multi-phase electric motor of the type used in electric cars. The motor 24 is electrically connected to a battery 10. The motor 24 can be a generator when the cart is pushed or pulled. In the event that the cart is pushed or propelled in any other manner, the motor 24 sends current back to the battery 10 for storage. A roof 17 is slanted 18 and has a plurality of gutters 21 on a first edge 19 and a second edge 20. The plurality of gutters 21 funnels water into the water storage unit 22 which has a faucet 35 attached for dispensing of stored water. A front side 2 of the cart has a handle 9 is fixedly attached on the cart so that the cart may be manually pushed or pulled.

Figure 4:
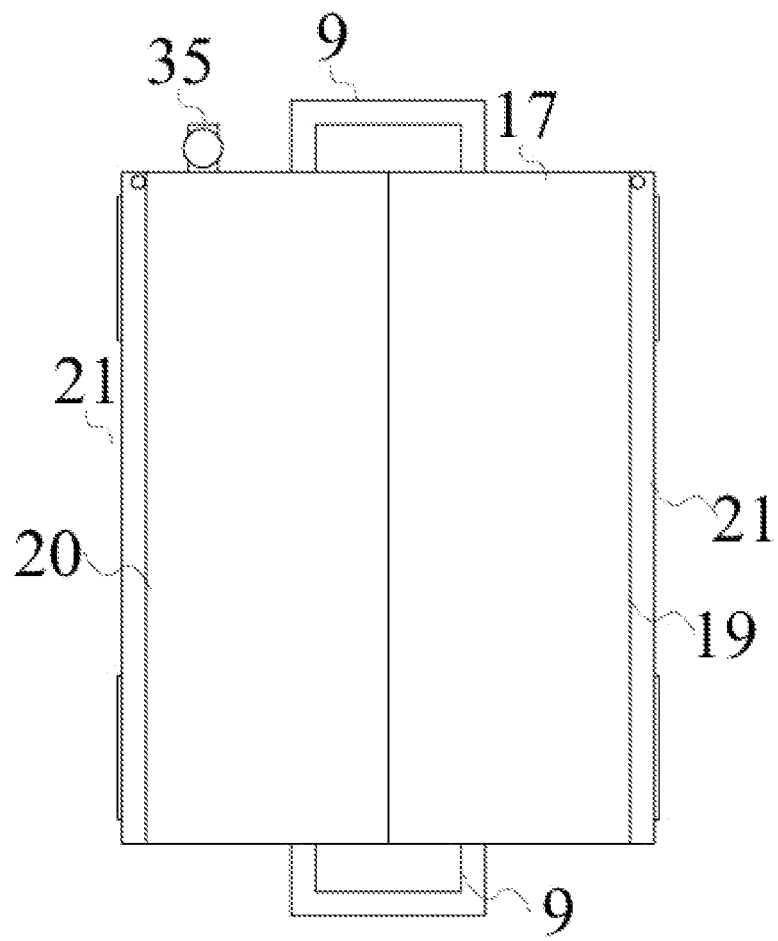
FIG. 4 is a top view of one embodiment of the present invention.

FIG. 4 shows a top view of the cart. A roof 17 has a first side 19 and a second side 20 with gutters 21 fixedly attached to both sides. The gutters 21 are positioned to funnel rainwater into a water storage unit 22. A faucet 35 is operably attached to the water storage unit 22. A plurality of handles 9 are fixedly attached to the front side 2 and the back side 3 of the cart.

Figure 5:
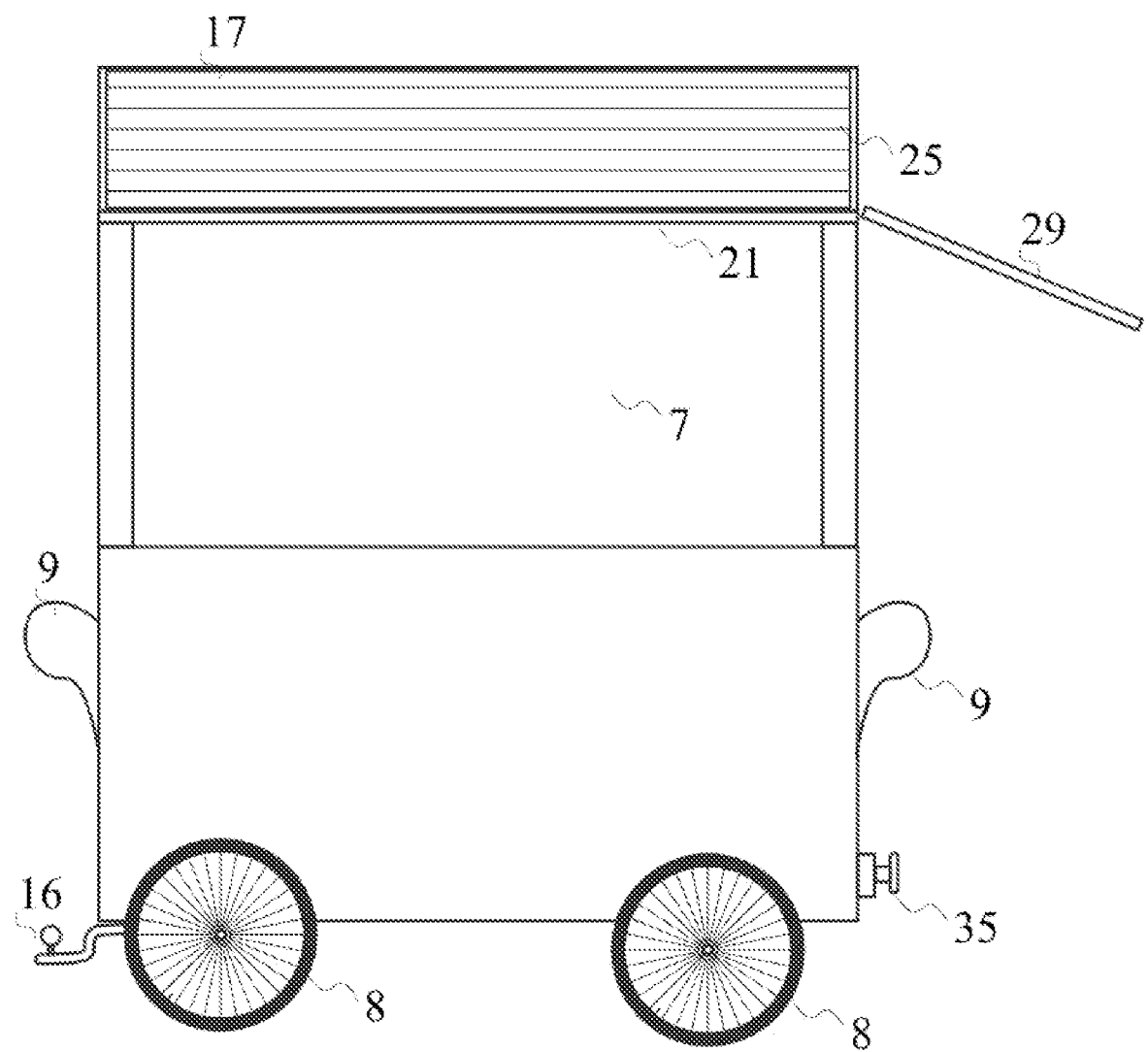
FIG. 5 is a left-side view of one embodiment of the present invention.

FIG. 5 shows a left side view of the cart which shows the second side 7 of the lounging and storage compartment 1. The roof 17 has a plurality of solar panels 25 fixedly attached to the roof. An awning 29 is moveably attached to a front side 2 of the lounging and storage compartment 1. A plurality of handles 9 are fixedly attached to the front side 2 and the back side 3 of the cart. A tow bar 16 is attached to a lower back side 3 of the lounging and storage compartment 1. Wheels 8 are operably attached to the cart. A gutter 21 is fixedly attached to the roof so that water is funneled into a water storage unit 22 and a faucet 35 is operably attached to the water storage unit 22.

FIG. 7 shows a right-side view of one embodiment of the present invention where the ventilation system 11 has an opening 12 and an air conditioning system 36 is inserted into the opening 12. The air conditioning system 36 is operably connected to the battery 10. The air conditioning system 36 may have a controller on an inside of the lounging and storage compartment to control the temperature in the cart. The cart may be towed by the tow bar 16 by any other vehicle. The wheels 8 generate power through the motor 31 which flows to the battery 10 for storage as the cart is towed, as shown in FIG. 1. Handles 9 allow a user to push or pull the cart. A door 23 may have a plurality of handles 34 situated on it in a manner so that the door 23 may be opened and a user may enter the lounging and storage compartment 1. The roof 17 is slanted 18 and a roof first edge 19 has a gutter 21 attached so that rainwater can be collected in a water storage unit 22. A faucet 35 is operatively attached to the water storage unit 22 so that water can be used for the user's daily activities.

Figure 8:
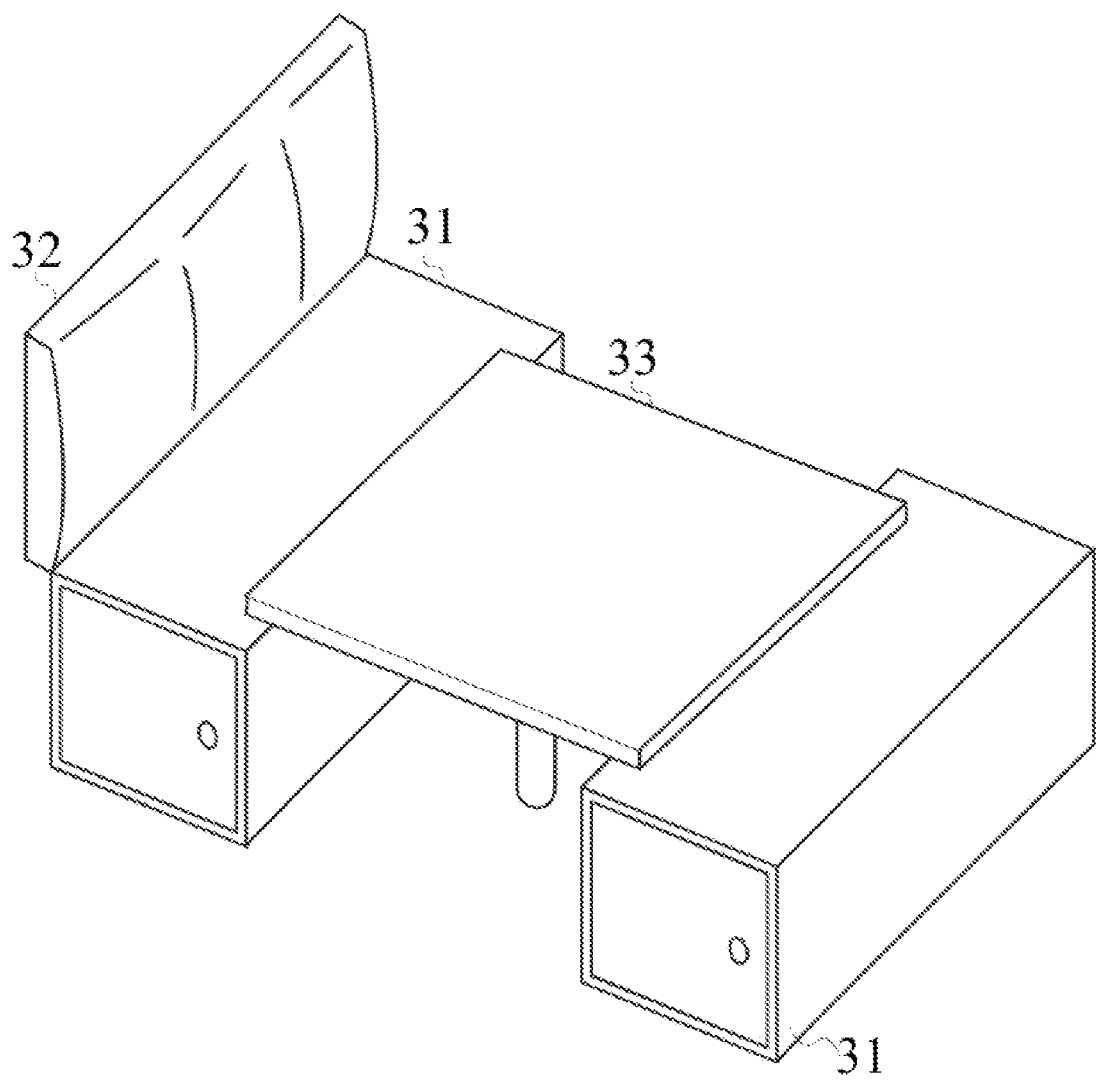
FIG. 8 is a view of one embodiment of the interior of the present invention.

FIG. 8 shows one embodiment of the inside of the lounging and storage compartment 1. Seats which double as storage units 31 are attached on either side of a table 33. A backrest 32 is fixedly attached to a wall of the lounging and storage compartment 1.

Although the invention has been explained in relation to its preferred embodiment, it is to be understood that many other possible modifications and variations can be made without departing from the spirit and scope of the invention.

What is claimed is:

1. A mobile collection and distribution cart comprises:
a lounging and storage compartment having a front side, a back side, a bottom side, a top side, a first side, and a second side;
a plurality of wheels operatively attached to the first side and the second side of the lounging and storage compartment;
a plurality of handles fixedly attached to the front side and the back side of the lounging and storage compartment;
a battery operatively attached to the mobile collection and distribution cart;
a ventilation system attached to the first side of the lounging and storage compartment;
a tow bar fixedly attached to a front side of the mobile collection and distribution cart;
a roof fixedly attached to the top side of the lounging and storage compartment;
a door operably attached to the first side or the second side of the lounging and storage compartment;
said plurality of wheels having a motor for propelling the mobile collection and distribution cart;
said motor being operatively attached to at least one of the plurality of wheels;
said motor being operative to generate electricity which is stored in the battery; and
a plurality of solar panels attached to a top side of the roof;
said plurality of solar panels being operatively connected to the battery;
a water storage unit fixedly attached to the mobile collection and distribution cart;
said roof being slanted;
said roof having a first edge and a second edge;
said roof having a plurality of gutters fixedly attached along the first edge and the second edge of the roof;
said gutters being operatively attached to the water storage unit;
said water storage unit being operatively connected to a faucet; and
said faucet being fixedly attached to the first side or the second side of the lounging and storage compartment.

2. The mobile collection and distribution cart of claim 1 further comprises:
a camera fixedly attached to the front side of the lounging and storage area;
said camera being electrically connected to the battery; and
said camera being wirelessly connected to a mobile device.

3. The mobile collection and distribution cart of claim 1 further comprises:
a global positioning satellite tracker being operatively positioned on an underside of the mobile collection and distribution cart.

4. The mobile collection and distribution cart of claim 1 further comprises:
an awning comprises a first side and a top side;
the first side of the awning being fixedly attached to the front side and the top side of the lounging and storage compartment; and
a plurality of awning solar panels fixedly attached to the top side of the awning.

5. The mobile collection and distribution cart of claim 1 further comprises:
the ventilation system which further comprises:
at least one opening in the first side of the living and storage compartment; and
a plurality of shutters operably attached to the at least one opening.

6. The mobile collection and distribution cart of claim 5 further comprises:
a rotatable fan fixedly attached in the at least one opening;
said fan being operably attached to a fan motor; and
said fan motor being electrically connected to the battery.

7. The mobile collection and distribution cart of claim 5 further comprises:
the ventilation system which further comprises:
an air conditioning system fixedly attached in the at least one opening; and
said air conditioning system being operably attached to the battery.

8. A mobile collection and distribution cart comprises:
a lounging and storage compartment having a front side, a back side, a bottom side, a top side, a first side, and a second side;
a plurality of wheels operatively attached to the first side and the second side of the lounging and storage compartment;
a plurality of handles fixedly attached to the front side and the back side of the lounging and storage compartment;
a battery operatively attached to the mobile collection and distribution cart;
a ventilation system attached to the first side of the lounging and storage compartment;
a tow bar fixedly attached to a front side of the mobile collection and distribution cart;
a roof fixedly attached to the top side of the lounging and storage compartment;
a door operably attached to the first side or the second side of the lounging and storage compartment;
said plurality of wheels having a motor for propelling the mobile collection and distribution cart;

said motor being operatively attached to at least one of the plurality of wheels;
said motor being operative to generate electricity which is stored in the battery; and
a plurality of solar panels attached to a top side of the roof;
said plurality of solar panels being operatively connected to the battery;
a water storage unit fixedly attached to the mobile collection and distribution cart;
said roof being slanted;
said roof having a first edge and a second edge;
said roof having a plurality of gutters fixedly attached along the first edge and the second edge of the roof;
said gutters being operatively attached to the water storage unit;
said water storage unit being operatively connected to a faucet;
said faucet being fixedly attached to the first side or the second side of the lounging and storage compartment;
a camera fixedly attached to the front side of the lounging and storage area;
said camera being electrically connected to the battery;
said camera being wirelessly connected to a mobile device; and
a global positioning satellite tracker being operatively positioned on an underside of the mobile collection and distribution cart.

9. The mobile collection and distribution cart of claim 8 further comprises:
an awning comprises a first side and a top side;
the first side of the awning being fixedly attached to the front side and the top side of the lounging and storage compartment; and
a plurality of awning solar panels fixedly attached to the top side of the awning.

10. The mobile collection and distribution cart of claim 8 further comprises:
the ventilation system further comprises:
at least one opening in the first side of the lounging and storage compartment;
a plurality of shutters operably attached to the at least one opening;
a rotatable fan fixedly attached in the at least one opening;
said fan being operably attached to a fan motor; and
said fan motor being electrically connected to the battery.

* * * * *